(12) United States Patent
Hirai et al.

(10) Patent No.: US 11,034,464 B2
(45) Date of Patent: Jun. 15, 2021

(54) HOLDING FIXTURE FIXING APPARATUS

(71) Applicant: MITSUBISHI HEAVY INDUSTRIES, LTD., Tokyo (JP)

(72) Inventors: Makoto Hirai, Tokyo (JP); Hiroki Azuma, Tokyo (JP); Michinobu Takahagi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 249 days.

(21) Appl. No.: 16/073,098

(22) PCT Filed: Nov. 17, 2016

(86) PCT No.: PCT/JP2016/084047
§ 371 (c)(1),
(2) Date: Jul. 26, 2018

(87) PCT Pub. No.: WO2017/134898
PCT Pub. Date: Aug. 10, 2017

(65) Prior Publication Data
US 2019/0031372 A1    Jan. 31, 2019

(30) Foreign Application Priority Data

Feb. 2, 2016  (JP) .............................. JP2016-018425

(51) Int. Cl.
*B64F 5/10*  (2017.01)
*B21J 15/14*  (2006.01)
(Continued)

(52) U.S. Cl.
CPC .............. *B64F 5/10* (2017.01); *B21J 15/142* (2013.01); *B21J 15/28* (2013.01); *B64C 1/12* (2013.01); *B23P 2700/01* (2013.01)

(58) Field of Classification Search
CPC . B64F 5/10; B21J 15/142; B21J 15/28; B64C 1/12; B23P 2700/01
(Continued)

(56) References Cited

U.S. PATENT DOCUMENTS

| 4,937,768 | A | 6/1990 | Carver et al. |
| 5,649,888 | A | 7/1997 | Micale et al. |

(Continued)

FOREIGN PATENT DOCUMENTS

| CN | 101362512 A | 2/2009 |
| CN | 101537887 A | 9/2009 |

(Continued)

OTHER PUBLICATIONS

Europe Patent Office, "Search Report for European Patent Application No. 16889381.6," dated Jun. 24, 2019.
(Continued)

*Primary Examiner* — Joseph J Hail
*Assistant Examiner* — J Stephen Taylor
(74) *Attorney, Agent, or Firm* — Manabu Kanesaka; Benjamin Hauptman; Kenneth Berner

(57) ABSTRACT

An object is to provide a holding fixture fixing apparatus which can ensure positioning accuracy and shape accuracy of a moving holding fixture, thus allowing an aircraft panel to be assembled with high accuracy. A holding fixture fixing apparatus includes a plurality of fixing units configured to support and fix a holding fixture, which holds a fuselage panel having a curved shape in cross section, from a lower surface of the holding fixture, the fixing units being provided on an installation surface, wherein the plurality of fixing units are provided corresponding to at least four corners of the lower surface of the holding fixture.

11 Claims, 14 Drawing Sheets

(51) Int. Cl.
  *B64C 1/12* (2006.01)
  *B21J 15/28* (2006.01)
(58) Field of Classification Search
  USPC .................................................... 269/289 R
  See application file for complete search history.

(56) References Cited

U.S. PATENT DOCUMENTS

| | | | |
|---|---|---|---|
| 8,905,368 | B2 | 12/2014 | Zameroski |
| 2002/0007548 | A1 | 1/2002 | Stoewer et al. |
| 2006/0182558 | A1* | 8/2006 | Frauen ...................... B64F 5/50 414/352 |
| 2012/0307228 | A1* | 12/2012 | Asano ...................... G05D 3/12 355/74 |

FOREIGN PATENT DOCUMENTS

| | | |
|---|---|---|
| CN | 102001451 A | 4/2011 |
| CN | 103465039 A | 12/2013 |
| CN | 104229158 A | 12/2014 |
| CN | 105109706 A | 12/2015 |
| CN | 105189033 A | 12/2015 |
| EP | 2792431 A1 | 10/2014 |
| EP | 2979810 A1 | 2/2016 |
| JP | S64-064740 A | 3/1989 |
| JP | H04-022747 A | 1/1992 |
| JP | 2006-247757 A | 9/2006 |
| JP | 2008-007114 A | 1/2008 |
| JP | 2011-208992 A | 10/2011 |
| JP | 2013-198918 A | 10/2013 |
| WO | 1997/34733 A1 | 9/1997 |
| WO | 1997/34734 A1 | 9/1997 |

OTHER PUBLICATIONS

Canada Patent Office, "Office Action for Canadian Patent Application No. 3,013,175," dated Jun. 27, 2019.
PCT/ISA/210, "International Search Report for International Application No. PCT/JP2016/084047," dated Feb. 7, 2017.
PCT/ISA/237, "Written Opinion of the International Searching Authority for International Application No. PCT/JP2016/084047," dated Feb. 7, 2017.
"A story toward making a jumbo jet airliner Boeing "777" (1) [in Gifu Works/Nagoya Works 1] Make a fuselage panel," Kawasaki News, Kawasaki Heavy Industries, Ltd., Public Relations Office, Apr. 2005, p. 1-7, No. 138.
Europe Patent Office, "Office Action for European Patent Application No. 16889381.6," dated Oct. 22, 2020.
China Patent Office, "Office Action for Chinese Patent Application No. 201680079979.3," dated Nov. 17, 2020.

* cited by examiner

HOLDING FIXTURE FIXING APPARATUS

RELATED APPLICATIONS

The present application is National Phase of International Application No. PCT/JP2016/084047 filed Nov. 17, 2016, and claims priority from Japanese Application No. 2016-018425, filed Feb. 2, 2016, the disclosure of which is hereby incorporated by reference herein in its entirety.

TECHNICAL FIELD

The present invention relates to a holding fixture fixing apparatus.

BACKGROUND ART

A fuselage panel of an aircraft is formed by combining: plate-like skins having a curved surface; long stringers which are mounted on the skins along a longitudinal direction of a fuselage; frames which are mounted along a circumferential direction of a fuselage; and other elements.

Joining of overlapped portions of the skins disposed adjacent to each other and joining of the frame with respect to the skin or the stringer are performed after the position of respective components is accurately determined using a positioning fixture. Rivets are used for joining the components. With the use of the positioning fixture, the respective components can be joined to the skin having low rigidity at an accurate position.

Conventionally, the positioning fixtures are used in a fixed state at predetermined positions in a plant and hence, the above-mentioned joining of the skins and joining of the frames are performed at the predetermined positions so as to manufacture a fuselage panel. The fuselage panel during manufacture is removed from the positioning fixture and is moved when the fuselage panel is moved from a work location in one step to a work location in a next step. The positioning fixtures per se are not moved.

CITATION LIST

Non Patent Literature

[NPL 1] "A story toward making a jumbo jet airliner Boeing "777" (1) [in Gifu Works/Nagoya Works 1] Make a fuselage panel", Kawasaki News, Kawasaki Heavy Industries, Ltd. Public Relations Office, April 2005, No. 138, p. 1-7

SUMMARY OF INVENTION

Technical Problem

A positioning fixture used in a fixed state at a predetermined position is prepared in advance conforming to the shape of a fuselage panel to be manufactured. The fuselage panel is not limited to have a single curved surface where the longitudinal direction extends in a straight line, but may have a double curved surface also having a curvature in the longitudinal direction. Accordingly, it is necessary to prepare a variety of positioning fixtures conforming to the shape of the fuselage panels thus increasing cost for preparation and management of the fixtures.

Assume a case where automatic riveting machines are installed at predetermined work spaces, and a fixture to which a fuselage panel is fixed is moved. In such a case, the fuselage panel fixed to the fixture is moved through a plurality of work spaces, thus allowing the fuselage panel to be formed into a finished product. In the case of a conventional positioning fixture, once the positioning fixture is installed, positioning accuracy and shape accuracy of the positioning fixture can be guaranteed. However, in the case of the moving fixture, unlike a conventional positioning fixture, after the fixture is moved, it is necessary to ensure that positioning accuracy and shape accuracy of the fixture meet accuracies required in assembling a fuselage panel at the respective work spaces. For example, when accuracy of 0.01 inch is required in assembling a fuselage panel, even greater accuracy is required in positioning the fuselage panel at the respective work spaces.

The present invention has been made under such circumstance, and it is an object of the present invention to provide a holding fixture fixing apparatus which is capable of ensuring positioning accuracy and shape accuracy of a moving holding fixture, thus allowing an aircraft panel to be assembled with high accuracy.

Solution to Problem

A holding fixture fixing apparatus according to one aspect of the present invention includes a plurality of fixing units configured to support and fix a holding fixture, which holds an aircraft panel having a curved shape in cross section, from a lower surface of the holding fixture, the fixing units being provided on an installation surface, wherein the plurality of fixing units are provided corresponding to at least four corners of the lower surface of the holding fixture.

With such a configuration, the holding fixture holds the aircraft panel having a curved shape in cross section, and the plurality of fixing units support and fix the holding fixture from the lower surface of the holding fixture. The plurality of fixing units are provided on the installation surface. The holding fixture is supported and fixed by the plurality of fixing units so that the holding fixture is positioned. The plurality of fixing units are provided corresponding to at least four corners of the lower surface of the holding fixture. Accordingly, expansion of the holding fixture in four directions can be prevented, thus ensuring shape accuracy of the holding fixture.

In the above-mentioned aspect, the holding fixture includes: two straight members opposedly facing each other and extending parallel to each other; and two curved members each having a curved shape which corresponds to a curved shape of the aircraft panel, the curved members being disposed on planes perpendicular to an axis direction of the straight member, and opposedly facing each other, wherein both end portions of each of the straight members are coupled to an end portion of one of the curved members and an end portion of the other of the curved members.

With such a configuration, the holding fixture includes the two straight members and the two curved members, and each straight member is coupled to the end portion of one of the curved members and the end portion of the other of the curved members. Accordingly, the holding fixture has a substantially saddle shape. Therefore, lower portions of the curved members are liable to expand outward, and have low rigidity. As described above, the plurality of fixing units are provided corresponding to at least four corners of the lower surface of the holding fixture. Accordingly, expansion of the holding fixture in four directions can be prevented, thus ensuring shape accuracy of the holding fixture.

In the above-mentioned aspect, a positioning unit is provided to the fixing unit or to the lower surface of the holding fixture which corresponds to the fixing unit, and the positioning unit is configured to define a position of the holding fixture in a horizontal plane or in a height direction.

In the above-mentioned aspect, the holding fixture fixing apparatus further includes: a stage unit to which the positioning unit is fixed; a laser tracker configured to emit a laser beam to a reflector installed on the stage unit and configured to receive the laser beam reflected on the reflector so as to detect a position of the reflector; and a control unit configured to adjust a position of the stage unit based on the position of the reflector detected by the laser tracker.

In the above-mentioned aspect, the plurality of fixing units are connected to each other by way of a cross beam member.

Advantageous Effects of Invention

According to the present invention, positioning accuracy and shape accuracy of a moving holding fixture can be ensured, thus allowing an aircraft panel to be assembled with high accuracy.

DESCRIPTION OF EMBODIMENTS

Hereinafter, embodiments according to the present invention are described with reference to drawings.

First Embodiment

A holding fixture fixing apparatus 2 according to a first embodiment of the present invention is applied to a fuselage panel manufacturing system where a holding fixture 1 is conveyed on a production line. A conveying track is provided to the fuselage panel manufacturing system, and the holding fixture 1 is moved in one direction along the conveying track. At respective work areas, a rivet fastening operation or the like is performed on the fuselage panel 10 in a state where the holding fixture 1 is fixed. That is, the fuselage panel 10 is fixed during the operation, and is moved only when the fuselage panel 10 is conveyed between work areas. It is unnecessary to change the method for moving the holding fixture 1 and the processing procedure of the holding fixture 1 corresponding to a kind of the fuselage panel 10. Accordingly, a variety of fuselage panels 10 can be manufactured in the same production line.

The holding fixture 1 is used for holding the shape of an aircraft panel in a predetermined shape in joining skins which form the aircraft panel to each other by rivets in an overlapping state, or in joining a frame to the skin or a stringer by rivets, for example.

Hereinafter, the description is made with respect to a method for manufacturing a fuselage panel 10 of an aircraft. However, the present invention is not limited to this embodiment. For example, the present invention is also applicable to a method for manufacturing an aircraft member other than the fuselage panel 10, such as a wing.

Figure 1:
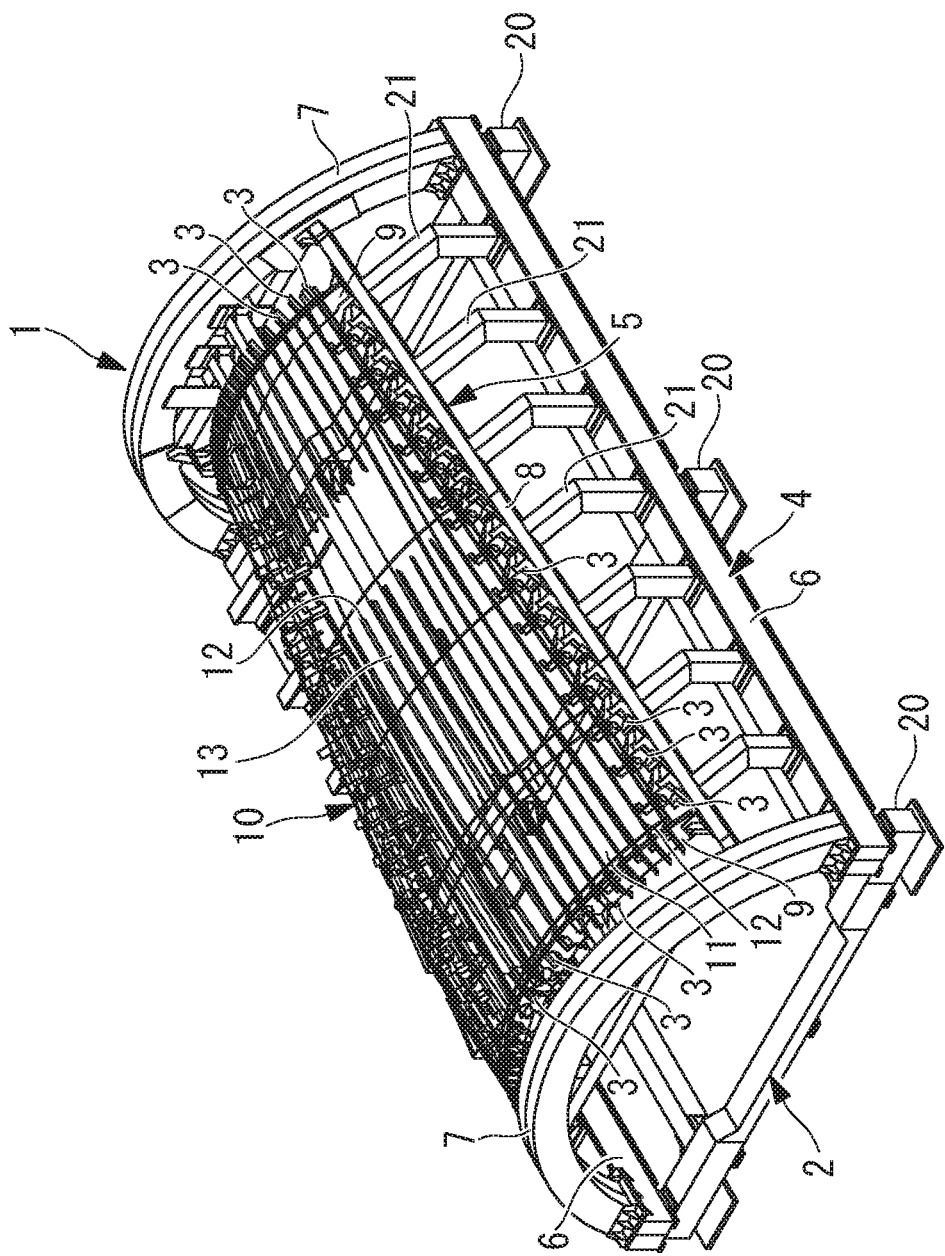
FIG. 1 is a perspective view showing a holding fixture according to one embodiment of the present invention, a fuselage panel placed on the holding fixture, and a holding fixture fixing apparatus on which the holding fixture is placed.

As shown in FIG. 1, the fuselage panel 10 of the aircraft is formed by combining: plate-like skins 11 having a curved surface; long stringers 12 which are mounted on the skins 11 along the axial direction (longitudinal direction) of a fuselage; frames (not shown in the drawing) which are mounted along the circumferential direction of the fuselage; and other elements. The fuselage panel 10 is made of aluminum or an aluminum alloy, for example. For one example of size, the length in the longitudinal direction is 10 m, the arc length is 6 m, and the plate thickness is from 2 mm to 5 mm.

In a step where the holding fixture 1 according to this embodiment holds the fuselage panel 10, the fuselage panel 10 has a shape which is obtained by dividing a substantially cylindrical fuselage portion of the aircraft in the axial direction and in the circumferential direction. Accordingly, the fuselage panel 10 has an arc shape in cross section taken in the direction perpendicular to the axial direction. The fuselage panel 10 has two straight opposite sides which extend parallel or oblique to the axial direction, and the two sides are positioned at lower edges of the fuselage panel 10 in a state where the fuselage panel 10 is held by the holding fixture 1. The fuselage panel 10 also has two opposite sides each of which is provided in a plane perpendicular to the axial direction, and the two sides have an arc shape, and are positioned at side edges of the fuselage panel 10 in a state where the fuselage panel 10 is held by the holding fixture 1.

Figure 3:
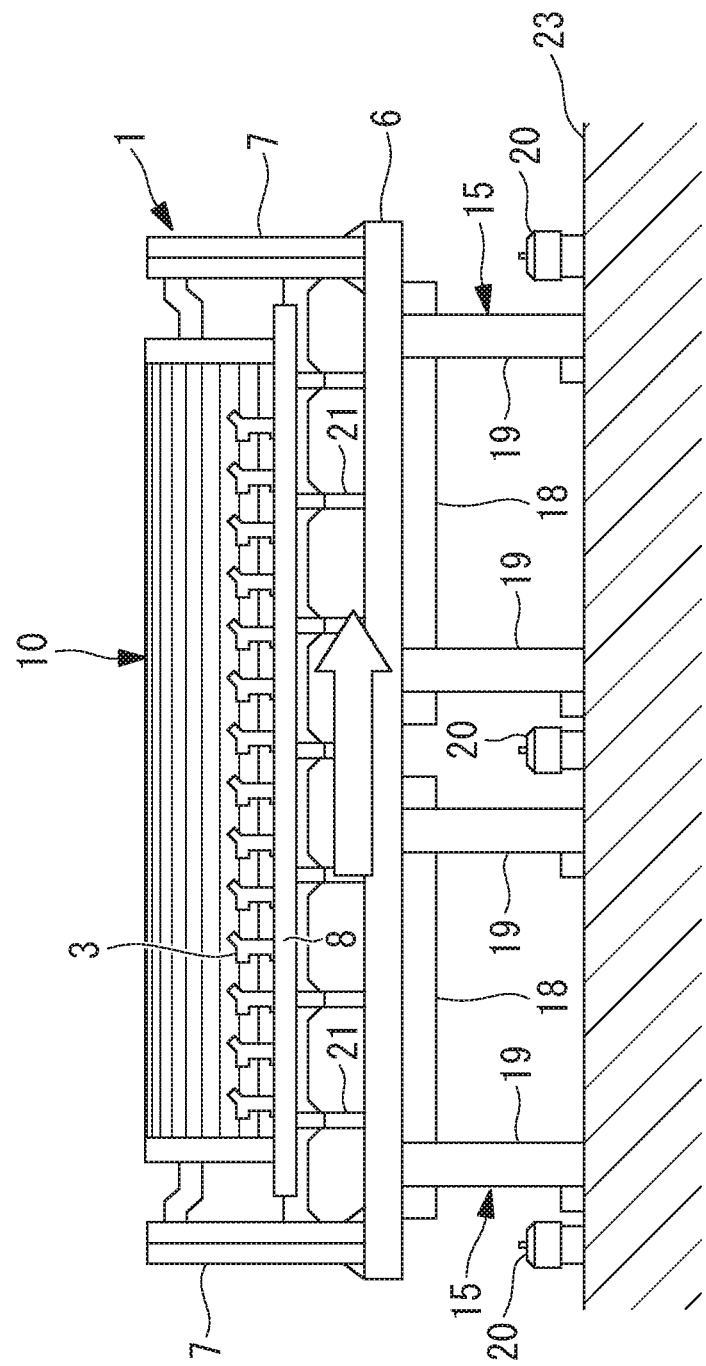
FIG. 3 is a side view showing the holding fixture according to one embodiment of the present invention, conveying apparatuses, and fixing units of the holding fixture fixing apparatus.

The holding fixture 1 is configured to be conveyable. For example, as shown in FIG. 3, the holding fixture 1 is placed on conveying apparatuses 15, and is conveyed from one end side to the other end side. The conveying apparatus 15 includes conveyors 16 such as chain conveyors or belt conveyors (see FIG. 5 and FIG. 6). The conveyors 16 are rotated by driving a motor (not shown in the drawing). The conveyors 16 are wound parallel to the horizontal members 6 of the holding fixture 1. The holding fixture 1 is made of aluminum or an aluminum alloy, for example. FIG. 1 shows a state where the holding fixture 1 is fixed to the holding fixture fixing apparatus 2.

The holding fixture 1 has a shape where a plurality of gripping units 3 are supported by a support member 5 so that the gripping units 3 and the support member 5 are formed into an integral body with a fixed relative position, and bottom portions of the two horizontal members 6 are disposed on the same plane. With such a configuration, the holding fixture 1 can be conveyed by the conveying apparatus 15.

While the holding fixture 1 is being moved by the conveying apparatus 15, a rivet fastening operation is not performed on the fuselage panel 10. The rivet fastening operation is performed on the fuselage panel 10 in a state where the holding fixture 1 is fixed at one position. For example, an automatic riveting machine is installed at a predetermined place and, when rivet fastening performed by this automatic riveting machine is completed, the holding fixture 1 is conveyed to another place by the conveying apparatus 15. At the place to which the holding fixture 1 is conveyed, another automatic riveting machine is installed, and rivet fastening is performed by another automatic riveting machine. Alternatively, the place to which the holding fixture 1 is conveyed is a work location where an operator performs an operation, and rivet fastening, inspection or the like is manually performed.

Figure 2:
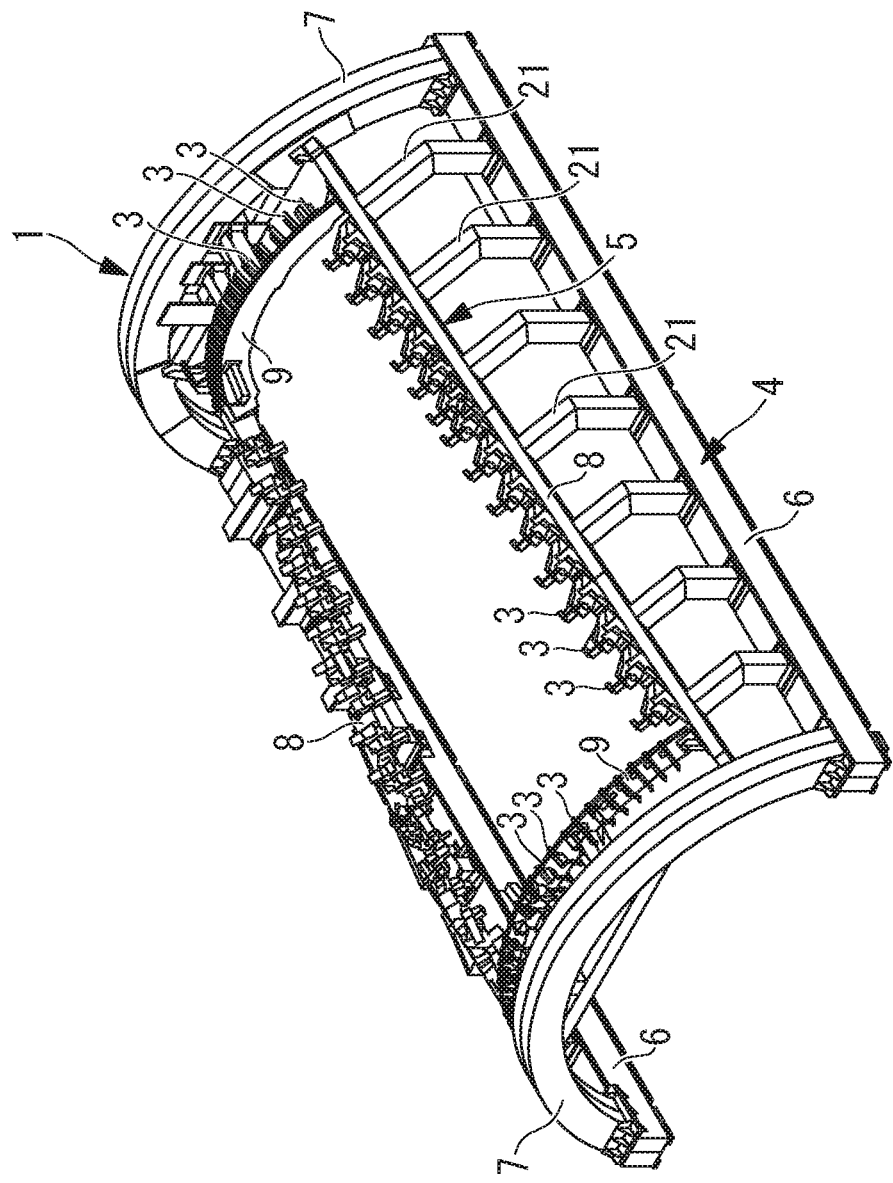
FIG. 2 is a perspective view showing the holding fixture according to one embodiment of the present invention.

As shown in FIG. 1 and FIG. 2, the holding fixture 1 according to this embodiment includes a frame member 4, the support member 5, the gripping units 3 and the like. When the fuselage panel 10 is held by the holding fixture 1, the fuselage panel 10 is held so as to project upward.

The frame member 4 is formed of: the two straight horizontal members 6 which extend in one direction; two arch members 7 which are disposed between the two horizontal members 6, and formed into an arch shape; and other elements. The horizontal members 6 and the arch members 7 of the frame member 4 support the support member 5 described later.

The horizontal members 6 are arranged so as to extend along the axial direction of the fuselage panel 10 to be set on the holding fixture 1, for example, to extend parallel to the axial direction of the fuselage panel 10. Lower edges of the arch members 7 are joined to end portions at one end of the horizontal members 6 and to end portions at the other end of the horizontal members 6. With such a configuration, the holding fixture 1 has a substantially saddle shape formed of the two horizontal members 6 and the two arch members 7.

In the holding fixture 1 of this embodiment, end portions at one end of the two horizontal members 6 are joined, and the end portions at the other end of the two horizontal members 6 are joined. Cross beam members which extend in the direction perpendicular to the horizontal members 6 are not provided to the holding fixture 1. With such a configuration, in a state where the fuselage panel 10 is set on the holding fixture 1, it is possible to ensure a work space which extends along the axial direction below the fuselage panel 10 without being interrupted by the cross beam members.

The length of the horizontal members 6 is set longer than the length in the axial direction of the fuselage panel 10 to be manufactured by rivet fastening. An arrangement interval between the two horizontal members 6 is set longer than the arc length of the fuselage panel 10 to be manufactured by rivet fastening.

Each arch member 7 has a curved shape, and forms the frame member 4. The arch member 7 is arranged in a plane in the direction perpendicular to the axial direction of the fuselage panel 10 to be set on the holding fixture 1. One arch member 7 is provided to ends on one side of the horizontal members 6, and another arch member 7 is provided to ends on the other side of the horizontal members 6. The arch members 7 are joined to the two horizontal members 6. Accordingly, the frame member 4 has a configuration where the horizontal members 6 and the arch members 7 are formed into an integral body. The curved shape of the arch members 7, for example, the curvature of the arch members 7 is set substantially corresponding to the curvature of the fuselage panel 10 to be manufactured.

The support member 5 is formed of: two straight lower edge support members 8 which extend in the axial direction; two side edge support members 9 which are disposed between the two lower edge support members 8, and are formed into an arch shape; and other elements.

The lower edge support members 8 support lower edges of the fuselage panel 10 by means of the gripping units 3. The lower edge support members 8 are positioned above the horizontal members 6 of the frame member 4. The lower edge support members 8 are arranged so as to extend along the axial direction of the fuselage panel 10 to be set on the holding fixture 1, for example, to extend in the direction parallel or oblique to the axial direction of the fuselage panel 10. The lower edge support members 8 are respectively arranged corresponding to two opposite sides of the fuselage panel 10 to be set on the holding fixture 1. For example, the lower edge support members 8 are arranged so as to extend along straight edge portions on two opposite sides of the fuselage panel 10.

For example, assume a case where the fuselage panel 10 to be manufactured has a single curved surface with a constant curvature along the axial direction. In such a case, the extending direction of the lower edge support members 8 and the extending direction of the horizontal members 6 are parallel to each other. On the other hand, assume a case where the fuselage panel 10 to be manufactured has a double curved surface with a varying curvature along the axial direction. In such a case, the extending direction of the lower edge support members 8 extends oblique with respect to the extending direction of the horizontal members 6.

Each lower edge support member 8 is supported by the horizontal member 6 by way of auxiliary members 21 disposed between the lower edge support member 8 and the horizontal member 6, for example. The auxiliary member 21 is a member having one end portion thereof connected to the horizontal member 6, and the other end portion thereof connected to the lower edge support member 8. The plurality of auxiliary members 21 are arranged along the longitudinal direction of the horizontal member 6 and the lower edge support member 8.

The plurality of gripping units 3 are arranged on the lower edge support member 8 at intervals. The length of the lower edge support member 8 is set longer than the length in the axial direction of the fuselage panel 10 to be manufactured. An arrangement interval between the two lower edge support members 8 is set longer than the arc length of the fuselage panel 10 to be manufactured. Further, the lower edge support members 8 are positioned below the fuselage panel 10 to be held so as to allow the gripping units 3 to support the lower edge portions of the fuselage panel 10 from below.

Lower ends of the side edge support members 9 are joined to one end portions and the other end portions of the lower edge support members 8 in the longitudinal direction.

The side edge support members 9 support side edges of the fuselage panel 10 by means of the gripping units 3. Each side edge support member 9 is a member having a curved shape. The side edge support member 9 is arranged in a plane in the direction perpendicular to the axial direction of the fuselage panel 10 to be set on the holding fixture 1. The side edge support members 9 are respectively arranged corresponding to two opposite sides of the fuselage panel 10 to be set on the holding fixture 1.

One side edge support member 9 is provided to ends on one side of the lower edge support members 8 in the longitudinal direction, and another side edge support member 9 is provided to ends on the other side of the lower edge support members 8 in the longitudinal direction. The side edge support members 9 are joined to the two lower edge support members 8. Accordingly, the support member 5 has a configuration where the lower edge support members 8 and the side edge support members 9 are formed into an integral body. The curved shape of the side edge support members 9, for example, the curvature of the side edge support members 9 is set according to the curvature of the fuselage panel 10 to be manufactured. A plurality of gripping units 3 having substantially the same configuration as the above-mentioned gripping units 3 may be provided to the side edge support members 9, and the gripping units 3 may grip and support the side edges of the fuselage panel 10.

At this point of operation, the plurality of gripping units 3 mounted on each side edge support member 9 are disposed at intervals at positions which correspond to the curvature of the fuselage panel 10 to be manufactured. Accordingly, when the plurality of gripping units 3 grip the fuselage panel 10, the fuselage panel 10 gripped by the gripping units 3 is held so as to have the curvature of the fuselage panel 10 to be manufactured.

For example, assume a case where the fuselage panel 10 to be manufactured has a single curved surface with a constant curvature along the axial direction. In such a case, the curvature obtained by connecting the gripping units 3 on the side edge support member 9 on one edge side is equal to the curvature obtained by connecting the gripping units 3 on the side edge support member 9 on the other edge side. On the other hand, assume a case where the fuselage panel 10 to be manufactured has a double curved surface with a varying curvature along the one-axis direction. In such a case, the curvature obtained by connecting the gripping units 3 on the side edge support member 9 on one edge side is larger than the curvature obtained by connecting the gripping units 3 on the side edge support member 9 on the other edge side.

Four conveying apparatuses 15 are installed at respective work areas, for example. In this case, as shown in FIG. 3, two conveying apparatuses 15 are installed on one horizontal member 6 of the holding fixture 1 positioned at a work area, and two conveying apparatuses 15 are installed on the other horizontal member 6. Each two conveying apparatuses 15 on one side are arranged in series along the conveying direction of the holding fixture 1.

Figure 4:
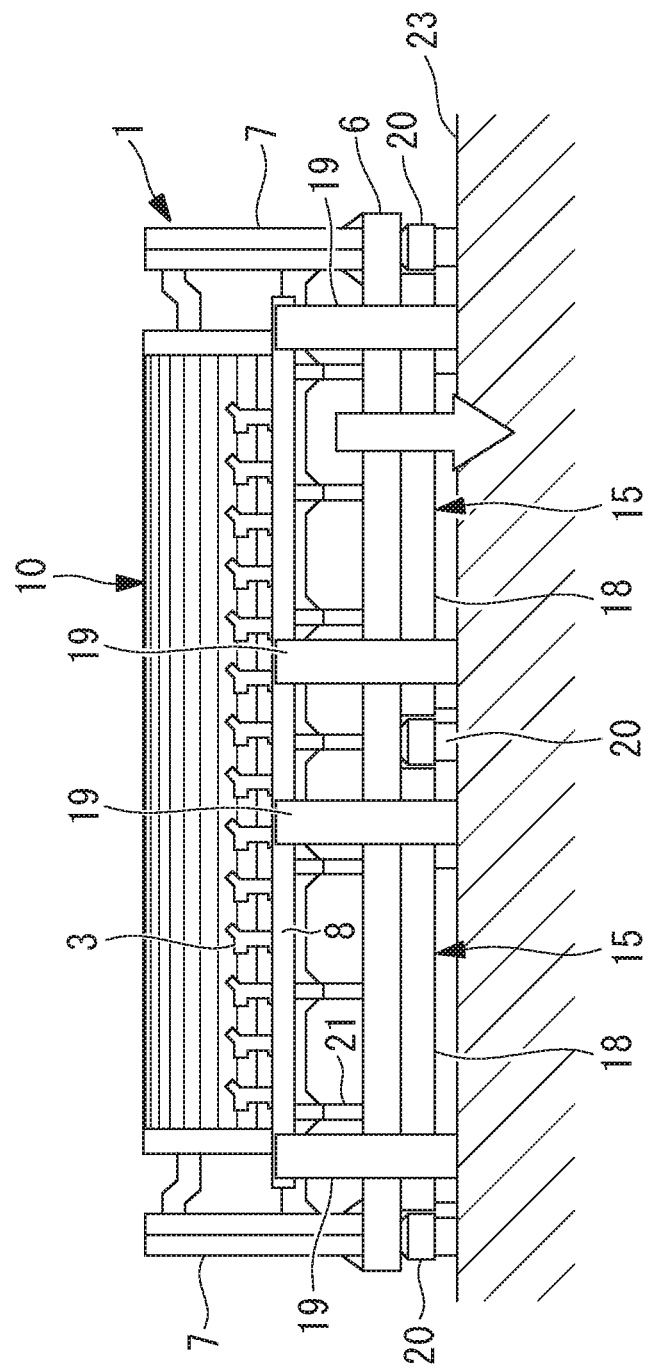
FIG. 4 is a side view showing the holding fixture according to one embodiment of the present invention, the conveying apparatuses, and the fixing units of the holding fixture fixing apparatus.

As shown in FIG. 3 and FIG. 4, the respective conveying apparatuses 15 can be lifted and lowered. Each conveying apparatus 15 includes, for example, a base unit 18 on which the holding fixture 1 is placed, lifting and lowering units 19 which lifts and lowers the base unit 18 while supporting the base unit 18, and other elements.

Figure 5:
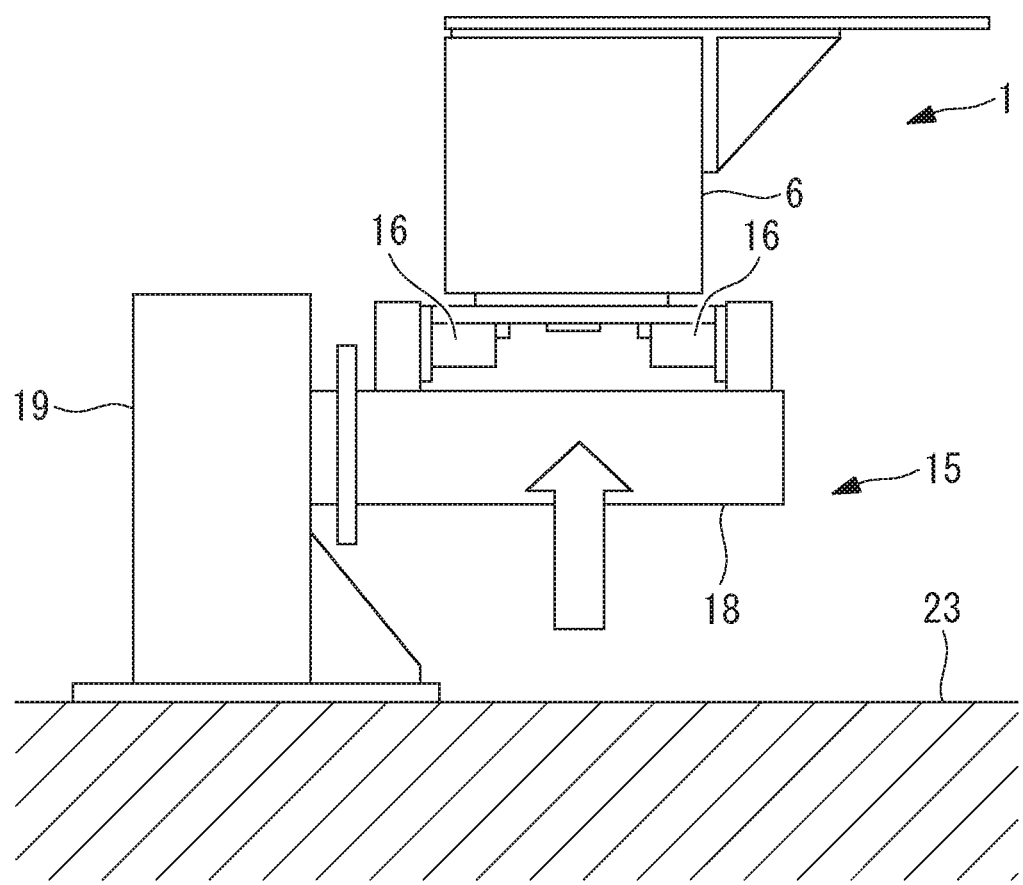
FIG. 5 is a front view showing the conveying apparatus according to the first embodiment of the present invention.
Figure 6:
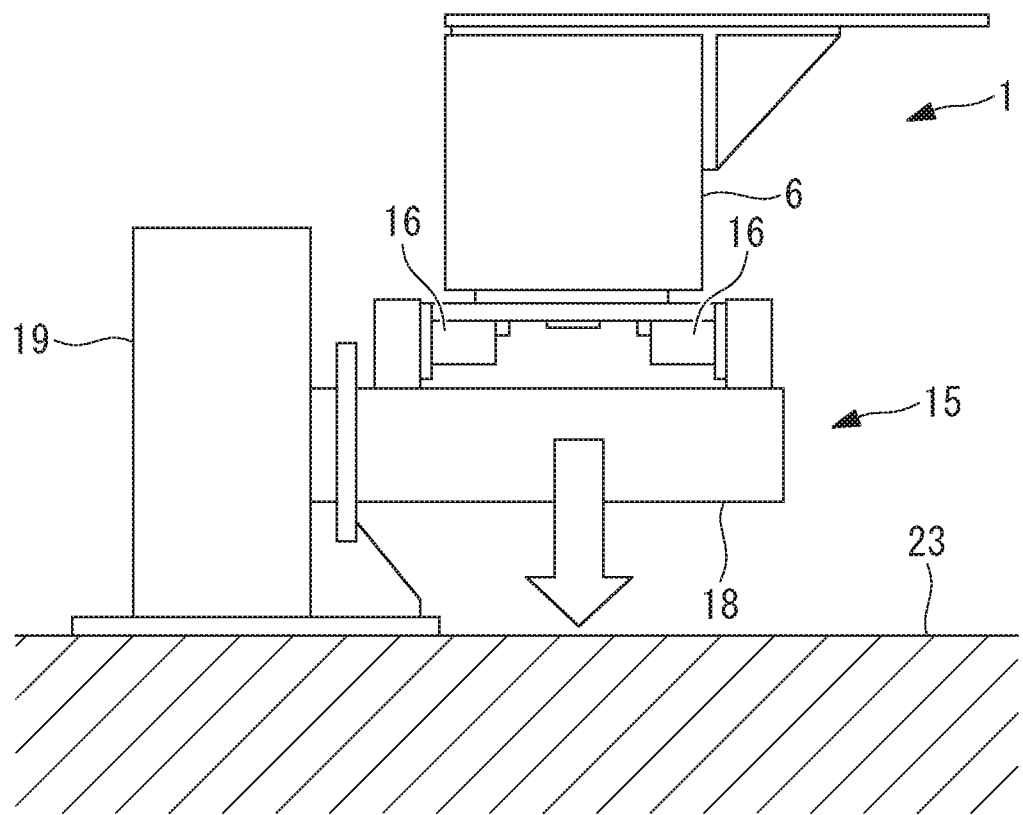
FIG. 6 is a front view showing the conveying apparatus according to the first embodiment of the present invention.
Figure 7:
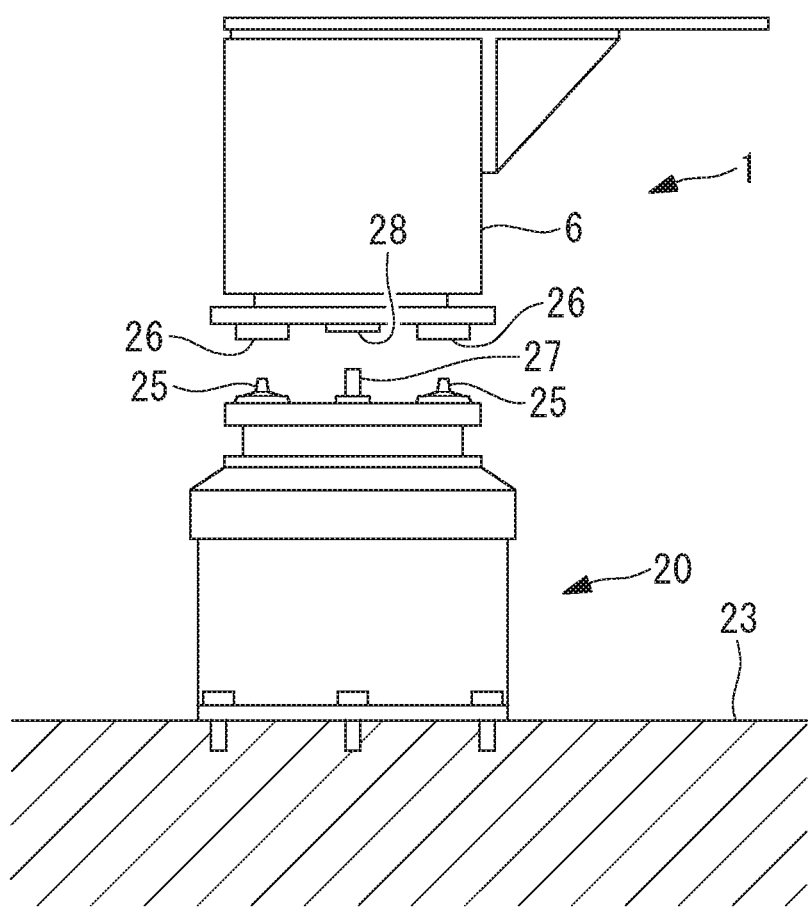
FIG. 7 is a front view showing the fixing unit of the holding fixture fixing apparatus according to the first embodiment of the present invention.
Figure 8:
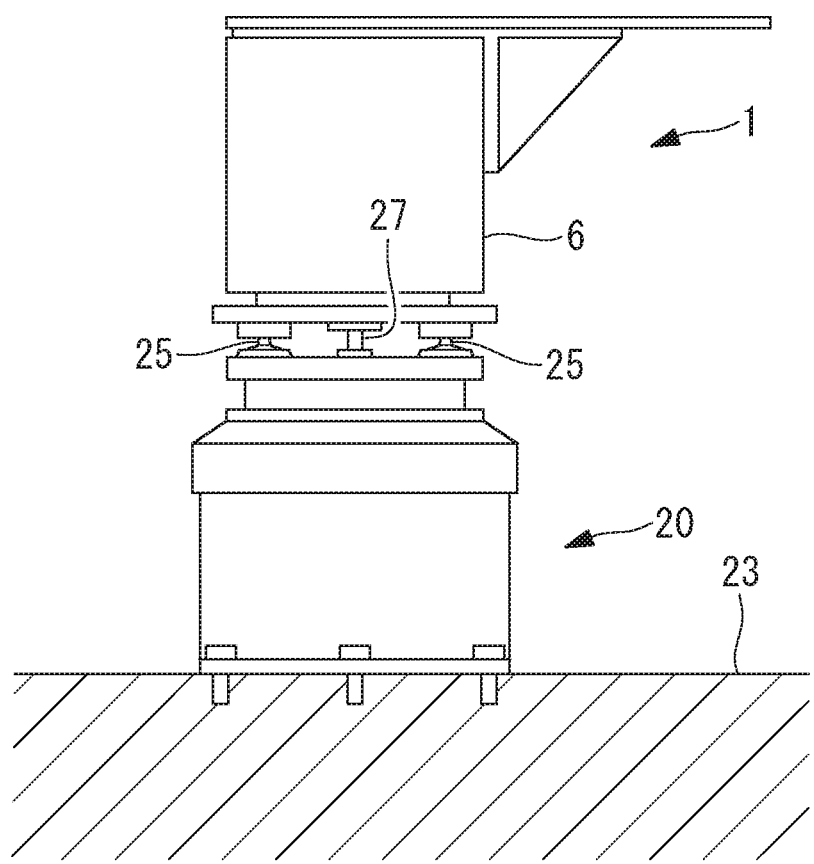
FIG. 8 is a front view showing the fixing unit of the holding fixture fixing apparatus according to the first embodiment of the present invention.

As shown in FIG. 3 and FIG. 5, when the lifting and lowering units 19 lift the base units 18, as shown in FIG. 7, the holding fixture 1 is lifted to the position which does not interfere with fixing units 20 of the holding fixture fixing apparatus 2. Accordingly, the holding fixture 1 can be conveyed in the horizontal direction on the base units 18. On the other hand, as shown in FIG. 4 and FIG. 6, when the lifting and lowering units 19 lower the base units 18, as shown in FIG. 8, the holding fixture 1 is positioned with respect to the fixing units 20.

As shown in FIG. 3, each base unit 18 is arranged with the longitudinal direction thereof extending horizontally, and receives a load of the holding fixture 1 through the horizontal member 6. As shown in FIG. 5, the base unit 18 includes the conveyors 16. The base units 18 are installed such that the conveyors 16 receive a load of the holding fixture 1 and, at the same time, are movable along the longitudinal direction in a state where the base units 18 are lifted. When the conveyors 16 is moved, the holding fixture 1 placed on upper surfaces of the conveyors 16 is moved in one direction. When the conveyors 16 are stopped in a state where the holding fixture 1 is placed on the upper surfaces of the conveyors 16, the movement of the holding fixture 1 is also stopped.

The fixing unit 20 is installed on the end portion side of each conveying apparatus 15 in the longitudinal direction so as to be disposed adjacent to the conveying apparatus 15. The fixing units 20 are provided corresponding to four corners of a lower surface of the holding fixture 1. In the example of the holding fixture 1 shown in FIG. 3 and FIG. 4, each fixing unit 20 is installed at a position directly below a portion at which the horizontal member 6 and the arch member 7 are coupled to each other.

As shown in FIG. 3 and FIG. 4, one fixing unit 20 may be installed between the two conveying apparatuses 15 arranged in series. With such a configuration, six fixing units 20 are provided for one holding fixture 1.

The plurality of fixing units 20 are provided corresponding to at least four corner portions of the lower surface of the holding fixture 1 and hence, expansion of the holding fixture 1 in four directions can be prevented, thus ensuring shape accuracy of the holding fixture 1. Further, the plurality of fixing units 20 are provided on an installation surface 23. The holding fixture 1 is supported and fixed by the plurality of fixing units 20 so that the holding fixture 1 is positioned with respect to the installation surface 23.

Figure 9:
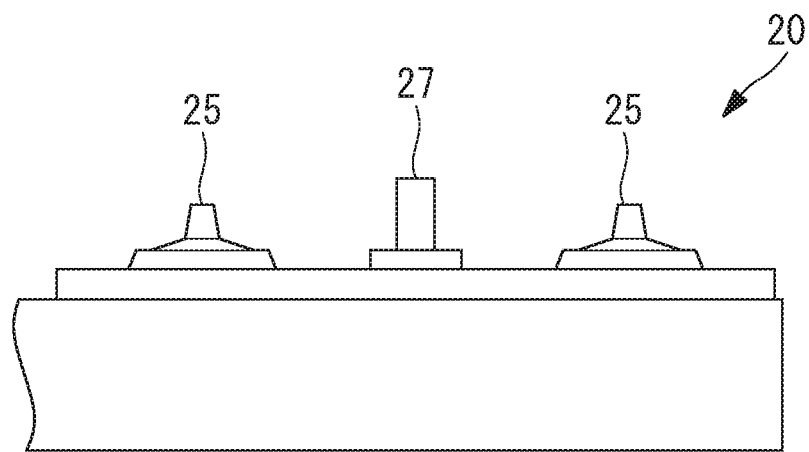
FIG. 9 is a front view showing the fixing unit of the holding fixture fixing apparatus according to the first embodiment of the present invention.

As shown in FIG. 8 and FIG. 9, self-aligning clamps 25 (positioning unit: also referred to as pallet clamps, for example) which project upward in the vertical direction are provided on an upper surface of each fixing unit 20. Positioning holes 26 (positioning unit) are formed on a lower surface of each horizontal member 6 of the holding fixture 1 corresponding to the self-aligning clamps 25 of the fixing units 20.

The self-aligning clamp 25 has a positioning function where fitting the self-aligning clamp 25 into the positioning hole 26 allows the positioning hole 26 to move to a predetermined position in a horizontal plane and a predetermined position in the height direction with respect to the self-aligning clamp 25. Accordingly, by allowing the self-aligning clamps 25 to be fitted into the positioning holes 26, it is possible to define the position of the holding fixture 1 in a horizontal plane and in the vertical direction with respect to the fixing units 20. The self-aligning clamp 25 also has a clamping function of fixing the positioning hole 26 so as to prevent the removal of the positioning hole 26 during fitting of the self-aligning clamp 25 into the positioning hole 26.

As shown in FIG. 8 and FIG. 9, a rough guide 27 is mounted on an upper surface of the fixing unit 20, and a guide hole 28 is formed on a lower surface of the horizontal member 6 of the holding fixture 1. The rough guide 27 is formed of a rod-shaped member, for example, and is mounted perpendicular to the upper surface of the fixing unit 20. The rough guide 27 can be inserted into the guide hole 28 so that the holding fixture 1 can be moved along the rough guide 27.

A diameter of the guide hole 28 is set to a size obtained by adding a tolerance, which does not allow the self-aligning clamp 25 and the positioning hole 26 to come into contact at a displaced position, to the diameter of the rough guide 27, for example.

Figure 10:
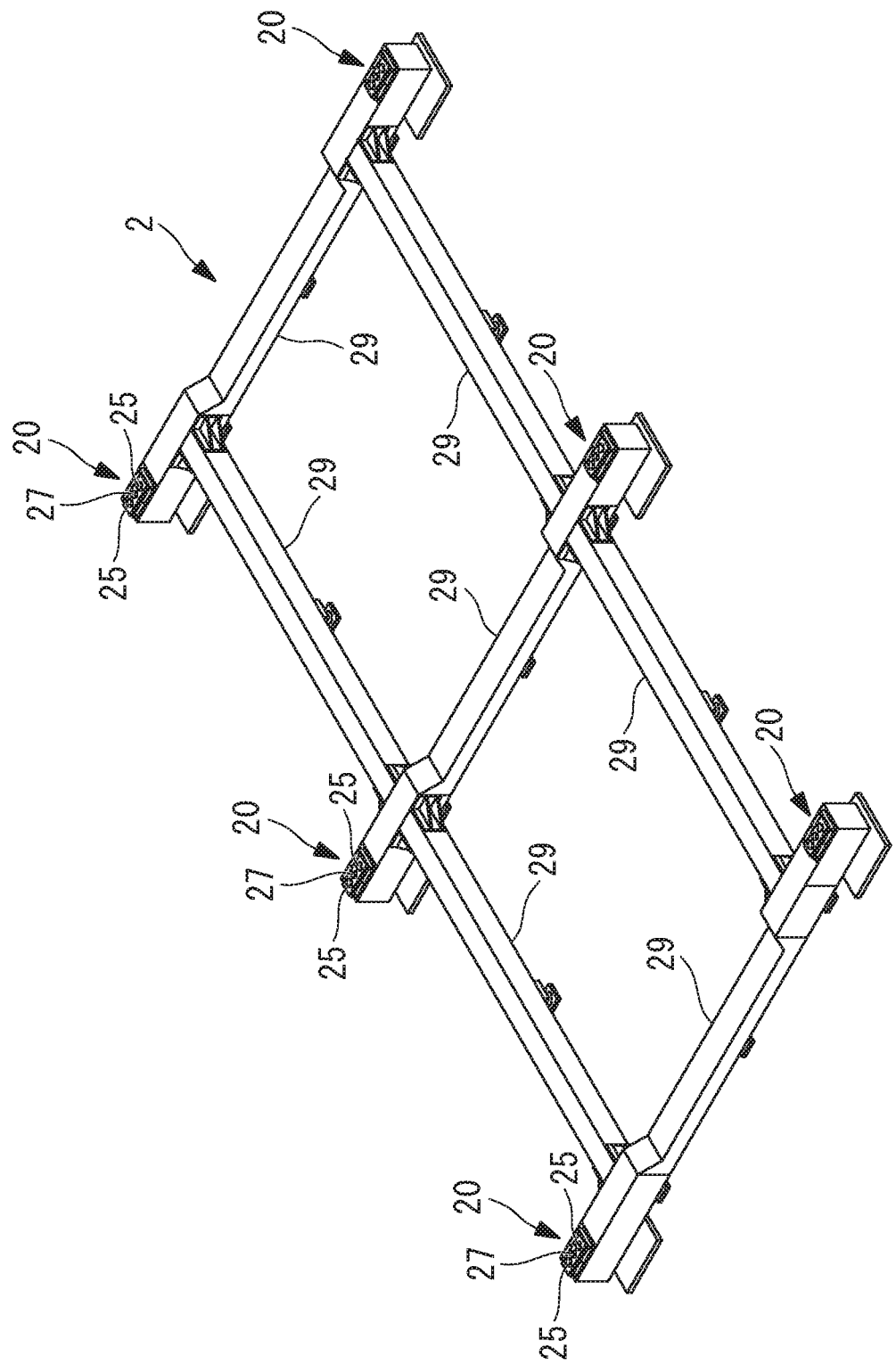
FIG. 10 is a perspective view showing the holding fixture fixing apparatus according to the first embodiment of the present invention.
Figure 11:
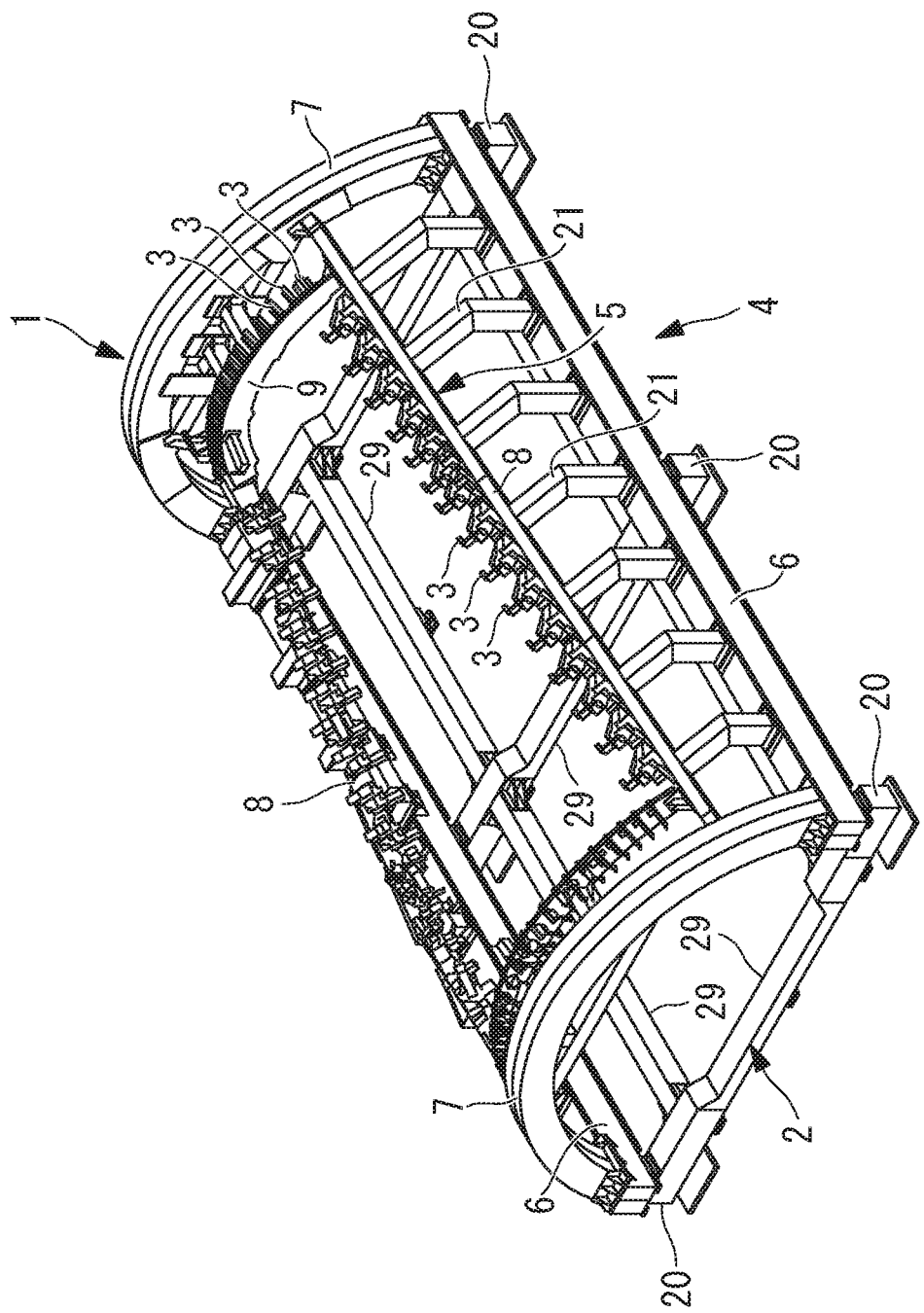
FIG. 11 is a perspective view showing the holding fixture fixing apparatus and the holding fixture according to the first embodiment of the present invention.

As described above, the plurality of fixing units 20 are arranged. As shown in FIG. 10, the fixing units 20 may be connected to each other by way of cross beam members 29, thus forming the holding fixture fixing apparatus 2. With such a configuration, it is possible to prevent variation in relative position between the respective fixing units 20. Accordingly, even if the holding fixture 1 is repeatedly mounted on and removed from the fixing units 20, the position of each of the plurality of fixing units 20 is minimally changed. Further, to allow a device, such as a riveting device, to be conveyed in the holding fixture fixing apparatus 2, the cross beam members 29 disposed perpendicular to the axial direction may have a removable structure in the configuration shown in FIG. 10. FIG. 11 shows a state where the holding fixture 1 is placed on the holding fixture fixing apparatus 2. Relative distances between the fixing units 20 are always maintained and hence, the shape of the holding fixture 1 which is supported by the plurality of fixing units 20 is guaranteed with high accuracy.

It is desirable that a material for forming the fixing units 20 and a material for forming the holding fixture 1 be the same, thus having the same coefficient of thermal expansion. By using the same material for the fixing units 20 and the holding fixture 1, positioning of the holding fixture 1 is less affected even when both the fixing units 20 and the holding fixture 1 thermally expand or contract due to change in ambient temperature of a work area.

The number of fixing units 20 to be installed and installation positions of the fixing units 20 are not limited to the above-mentioned example. The number of fixing units 20 to be installed, the installation positions of the fixing units 20, the number of self-aligning clamps 25 to be installed, and the installation positions of the self-aligning clamps 25 are changed according to the weights of the holding fixture 1 and the fuselage panel 10 which the fixing units 20 and the self-aligning clamps 25 hold thereon, the shape of the holding fixture 1 and the like.

To convey the above-mentioned holding fixture 1 according to this embodiment, first, the holding fixture 1 placed on a cart is moved to a conveying track, and the holding fixture 1 is moved onto the conveying track. Then, the holding fixture 1 is moved through respective work areas along the conveying track. The holding fixture 1 is moved on the conveying track by the conveyors 16 of the conveying apparatuses 15 which are positioned at a bottom portion of the holding fixture 1, for example.

Next, when the holding fixture 1 is moved between the work areas, each conveying apparatus 15 is in a state where the base unit 18 is lifted by the lifting and lowering units 19. At this point of operation, the holding fixture 1 and the fixing units 20 have the positional relationship where the holding fixture 1 and the fixing units 20 are separated from each other.

By driving the conveyors 16, the holding fixture 1 is moved to the predetermined position in the work space. In this embodiment, the predetermined position in the work space means, for example, the position where the self-aligning clamps 25 of the fixing units 20 and the positioning holes 26 formed on the lower surface of the holding fixture 1 are positioned vertically so that a center axis of each self-aligning clamp 25 and a center axis of each positioning hole 26 substantially agree with each other.

Next, the holding fixture 1 is lowered by the lifting and lowering units 19 of the conveying apparatus 15. At this point of operation, first, the holding fixture 1 is lowered while allowing the rough guides 27 to be inserted into the guide holes 28 so as to cause the rough guides 27 to guide the holding fixture 1. This operation prevents the self-aligning clamp 25 and the positioning hole 26 of the holding fixture 1 from coming into contact with each other at a displaced position, thus preventing the self-aligning clamp 25 or the positioning hole 26 from being damaged.

When the holding fixture 1 is further lowered, the self-aligning clamps 25 are fitted into the positioning holes 26. Thereafter, the holding fixture 1 is positioned at an accurate position by self-aligning mechanisms of the self-aligning clamps 25. Further, the holding fixture 1 and the fixing units 20 are firmly fixed to each other by clamping mechanisms of the self-aligning clamp 25.

The plurality of fixing units 20 are provided on the installation surface 23. The holding fixture 1 is supported and fixed by the plurality of fixing units 20 so that the holding fixture 1 is positioned with respect to the installation surface 23.

The plurality of fixing units 20 are provided corresponding to four corner portions of the lower surface of the holding fixture 1. The fixing unit 20 is also provided between each two conveying apparatuses 15 arranged in series so that six fixing units 20 are installed in total. Accordingly, expansion of the holding fixture 1 in four directions can be prevented, thus ensuring shape accuracy of the holding fixture 1.

Then, after a rivet fastening operation or the like at the work area is completed, fixing of the holding fixture 1 by the clamping mechanisms of the self-aligning clamps 25 is released so as to cause the holding fixture 1 to be lifted by the lifting and lowering units 19 of the conveying apparatuses 15. With such operations, the holding fixture 1 and the fixing units 20 have the positional relationship where holding fixture 1 and the fixing units 20 are separated from each other. Then, the holding fixture 1 on the conveying track is moved by the conveyors 16 of the conveying apparatuses 15. With such an operation, the holding fixture 1 is moved to another work area next to the work area.

Next, a method for installing the self-aligning clamps 25 of the plurality of fixing units 20 is described with reference to FIG. 12 and FIG. 13.

The self-aligning clamps 25 of the fixing units 20 are installed such that the positional relationship of the self-aligning clamps 25 of the plurality of fixing units 20 is made uniform among respective work areas. With such an installation, in this embodiment where the holding fixture 1 is conveyed between the work areas, and is fixed at the respective work areas, it is possible to guarantee substantially the same accuracy as a conventional positioning fixture where once the fixture is installed, positioning accuracy and shape accuracy of the fixture can be guaranteed.

Figure 12:
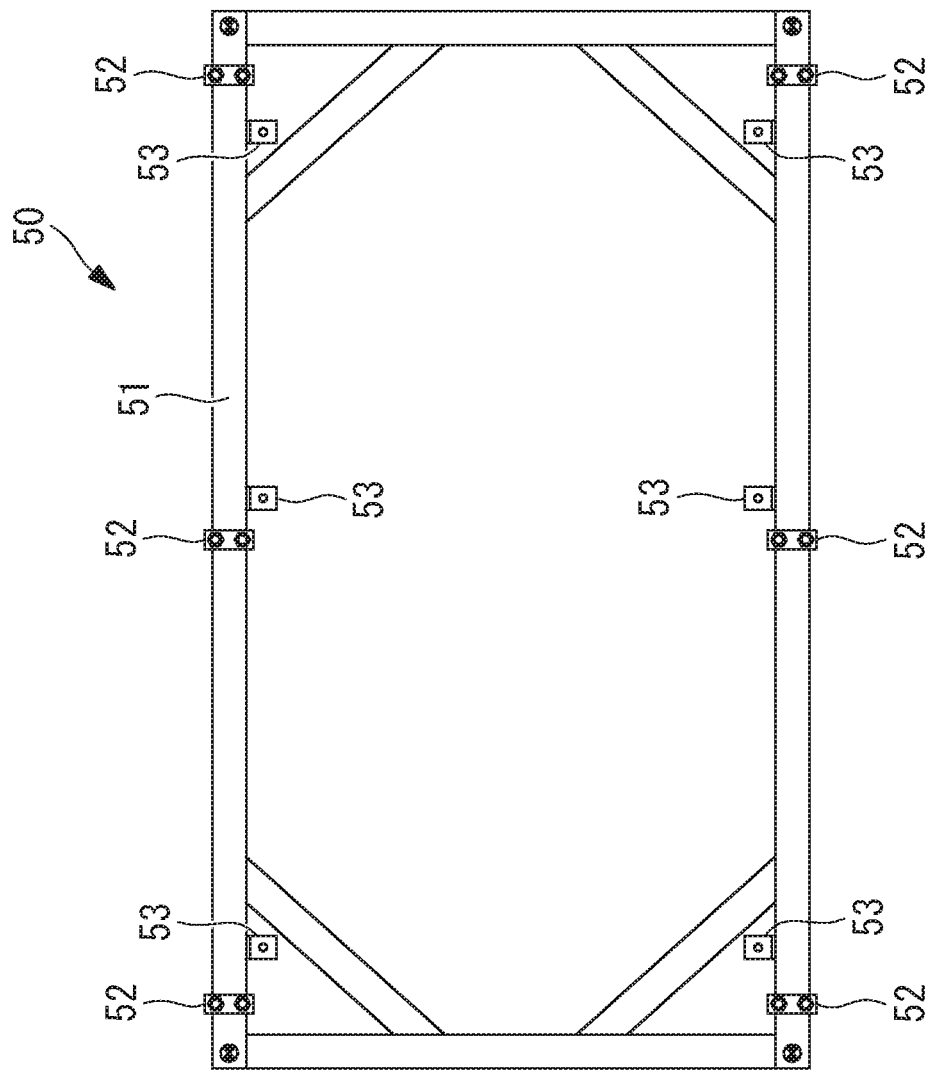
FIG. 12 is a bottom view showing a reference fixture according to the first embodiment of the present invention.
Figure 13:
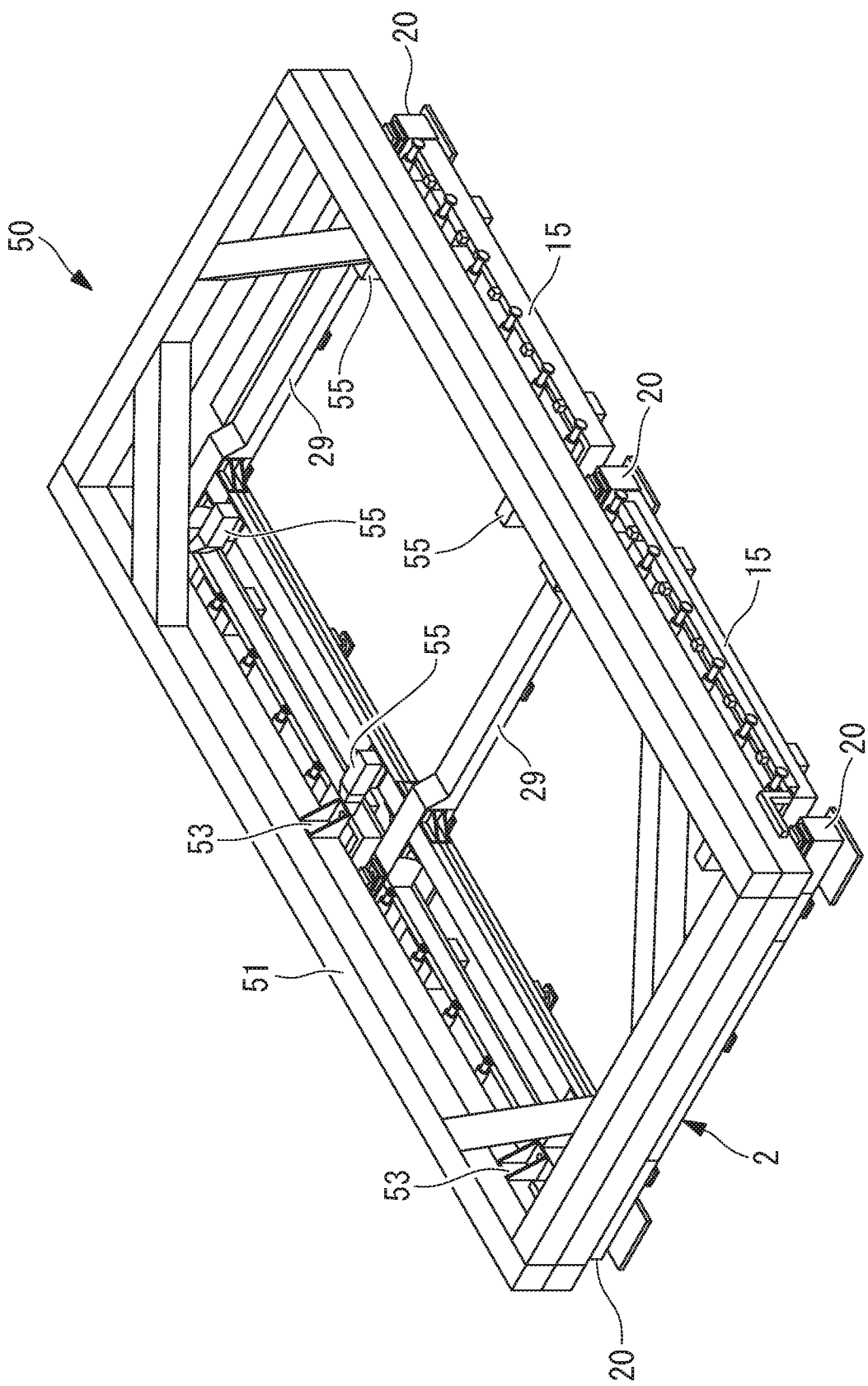
FIG. 13 is a perspective view showing the holding fixture fixing apparatus and the reference fixture according to the first embodiment of the present invention.

To be more specific, one reference fixture 50 shown in FIG. 12 is used. As shown in FIG. 13, the reference fixture 50 is disposed on the plurality of fixing units 20 at the respective work areas. At this point of operation, the self-aligning clamps 25 are installed on the plurality of fixing units 20 at predetermined positions.

The reference fixture 50 includes a frame member 51 which is a rectangular integral body, for example. A plurality of joint units 52 and a plurality of positioning units 53 are mounted on the frame member 51.

The plurality of joint units 52 are mounted on a lower surface of the frame member 51, and can be joined to the self-aligning clamps 25 of the fixing units 20. The joint units 52 are provided at positions which correspond to the self-aligning clamps 25 installed on the fixing units 20.

The plurality of positioning units 53 are mounted on an inner side surface of the frame member 51. The positioning units 53 of the reference fixture 50 are provided at positions which correspond to the positioning units mounted on the holding fixture fixing apparatus 2 so that the positioning units 53 can be positioned with respect to positioning units 55 provided to the holding fixture fixing apparatus 2 (see FIG. 13).

A member where the self-aligning clamps 25 and the rough guide 27 are formed into an integral body (not shown in the drawing) is joined to each joint unit 52 of the reference fixture 50. With such an operation, the reference fixture 50 is disposed on an upper portion of each fixing unit 20 where the self-aligning clamps 25 and the rough guide 27 are not installed.

At this point of operation, the positioning units 53 of the reference fixture 50 are positioned to the positioning units 55 provided to the holding fixture fixing apparatus 2. Then, the member where the self-aligning clamps 25 and the rough guide 27 are formed into an integral body is fixed onto the fixing unit 20 using a tool or the like. Thereafter, joining of the member where the self-aligning clamps 25 and the rough guide 27 are formed into an integral body is released from the joint unit 52 of the reference fixture 50. Such an operation is performed on the plurality of fixing units 20 at one work area.

By performing such operations, the installation position of the member where the self-aligning clamps 25 and the rough guide 27 are formed into an integral body is defined with high accuracy. As a result, the positional relationship between the self-aligning clamps 25 of the plurality of fixing units 20 is determined simultaneously at one work area.

Further, the same reference fixture 50 is moved to another work area, and the self-aligning clamps 25 are fixed onto the fixing units 20 with a procedure substantially equal to the above-mentioned operations. The installation operation of the self-aligning clamps 25 are performed at the plurality of work areas using the same reference fixture 50. Accordingly, the plurality of self-aligning clamps 25 are installed with the uniform positional relationship at the respective work areas.

Next, periodic inspections for maintaining accuracy of the holding fixture fixing apparatus 2 is described.

In inspections performed at short intervals of approximately one month, first, markers attached to the fixing units 20 or the like are read by a laser tracker or the like so as to confirm positioning accuracy of the holding fixture fixing apparatus 2. When the measured result falls outside the allowable range, the fixing units 20 are reinstalled using the reference fixture 50.

In periodic inspections performed approximately once a year, the measurement is performed in more detail. That is, not only positioning accuracies of the fixing units 20, but also positioning accuracies of all reference points provided to the holding fixture fixing apparatus 2 are measured using a laser tracker or the like. At this point of operation, the holding fixture 1 and the fixing units 20 may be corrected so as to acquire required accuracies when necessary.

Second Embodiment

Figure 14:
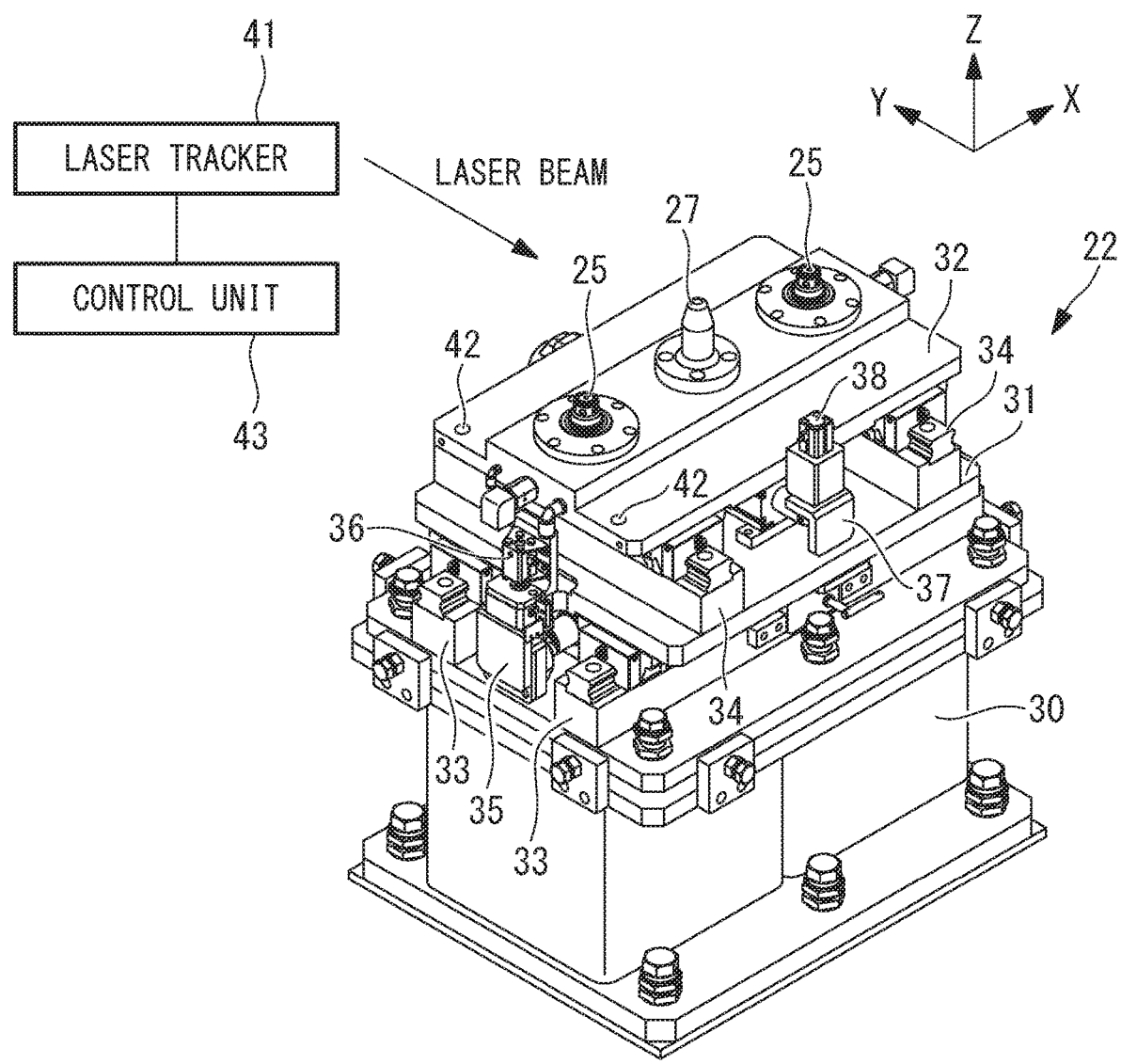
FIG. 14 is a perspective view showing a fixing unit of a holding fixture fixing apparatus according to a second embodiment of the present invention.

Next, a holding fixture fixing apparatus according to a second embodiment of the present invention is described with reference to FIG. 14. The detailed description of constitutional elements and the manner of operation and advantageous effects which are equal to those in the first embodiment is omitted.

In the above-mentioned first embodiment, the description has been made with respect to the case where the self-aligning clamps 25 and the rough guide 27 are mounted on each fixing unit 20 in a fixed manner. However, the present invention is not limited to such an example. In this embodiment, the self-aligning clamps 25 are provided to a stage mechanism which is movable in two axis directions orthogonal to each other. The stage mechanism includes a stage unit, a linear guide, a stopper, a ball screw mechanism and other elements, for example.

The stage unit includes, for example, a first stage unit 31 which is movable in one direction (X direction), and a second stage unit 32 which is movable in a direction (Y direction) perpendicular to the one direction. The first stage unit 31 and the second stage unit 32 are positioned vertically, and extend parallel to each other. The first stage unit 31 is installed onto a body unit 30 of a fixing unit 22 with linear guides 33, which allow the first stage unit 31 to move in the X direction, interposed therebetween. The second stage unit 32 is installed onto the first stage unit 31 with linear guides 34, which allow the second stage unit 32 to move in the Y direction, interposed therebetween.

The self-aligning clamps 25 and the rough guide 27 are installed on the second stage unit 32. The first stage unit 31 moves in the X direction and the second stage unit 32 moves in the Y direction and hence, the self-aligning clamps 25 and the rough guide 27 are movable in an X-Y plane.

The stopper (not shown in the drawing) fixes the positions of the first stage unit 31 and the second stage unit 32 on which position adjustment is performed. The self-aligning clamps 25 and the rough guide 27 are fixed by the stopper by way of the first stage unit 31 and the second stage unit 32. However, positions of the self-aligning clamps 25 and the rough guide 27 may be changed due to operations repeatedly performed on a daily basis. In this case, for example, the position of the second stage unit 32 may be measured so as to inspect whether positions of the self-aligning clamps 25 and the rough guide 27 are at appropriate positions and, then, a position adjustment may be performed.

The position of the second stage unit 32 is measured by a laser tracker 41, reflectors 42, and a control unit 43, for example. The laser tracker 41 is installed at the position separated from the fixing unit 22 at a distance, and emits a laser beam and receives the reflected beam from the reflectors 42. The reflectors 42 are mounted on the second stage. The laser tracker 41 emits a laser beam and receives the laser beam reflected on the reflectors 42 mounted on the second stage unit 32, thus detecting the position of the second stage unit 32.

The control unit 43 drives a motor 36 of a first ball screw mechanism 35, which moves the first stage unit 31, based on the detected position of the second stage unit 32, thus moving the first stage unit 31 in the X direction. The control unit 43 drives a motor 38 of a second ball screw mechanism 37, which moves the second stage unit 32, based on the detected position of the second stage unit 32, thus moving the second stage unit 32 in the Y direction. With such a configuration, the positions of the self-aligning clamps 25 and the rough guide 27 can be changed. Performing the position detection by the laser tracker 41 and performing the position adjustment by the ball screw mechanisms enable simple and rapid position adjustment with high accuracy.

Even if the position of the self-aligning clamp 25 or the rough guide 27 is changed due to repeated mounting and removing of the holding fixture 1, the position adjustment can be performed before starting the operation or the like. Accordingly, positioning with high accuracy and shape maintenance can be performed at regular intervals in a simple and rapid manner.

In the above-mentioned first and second embodiments, the description has been made with respect to the case where the self-aligning clamps 25 and the rough guide 27 are mounted on the fixing units 20, 22, and the positioning holes 26 and the guide holes 28 are formed on the holding fixture 1. However, the present invention is not limited to such an example. Self-aligning clamps and rough guides may be mounted on the holding fixture 1, and positioning holes and guide holes may be formed on the fixing units 20, 22 in an opposite manner to the above-mentioned example.

As described in the first embodiment with reference to FIG. 10, the plurality of respective fixing units 22 may be connected to each other by way of the cross beam members 29 also in the second embodiment.

REFERENCE SIGNS LIST 1 holding fixture
2 holding fixture fixing apparatus
3 gripping unit
4 frame member
5 support member
6 horizontal member
7 arch member
8 lower edge support member
9 side edge support member
10 fuselage panel
11 skin
12 stringer
15 conveying apparatus
16 conveyor
18 base unit
19 lifting and lowering unit
20, 22 fixing unit
21 auxiliary member
23 installation surface
25 self-aligning clamp (positioning unit)
26 positioning hole (positioning unit)
27 rough guide
28 guide hole
29 cross beam member
30 body unit
31 first stage unit
32 second stage unit
33, 34 linear guide
35 first ball screw mechanism
36, 38 motor
37 second ball screw mechanism
41 laser tracker
42 reflector
43 control unit
50 reference fixture
51 frame member
52 joint unit
53, 55 positioning unit

The invention claimed is:

1. A holding fixture fixing apparatus comprising:
a plurality of fixing units configured to support and fix a holding fixture, which holds an aircraft panel having a curved shape in cross section and being movable, from a lower surface of the holding fixture, the fixing units being provided on an installation surface, wherein
the plurality of fixing units is provided corresponding to at least four corners of the lower surface of the holding fixture,
the fixing units are connected to each other by way of a plurality of bar-shaped cross beam members,
the fixing units comprise a positioning unit configured to define a position of the holding fixture in a horizontal plane or in a height direction,
the positioning unit comprises a self-aligning clamp which projects in a vertical direction and is fitted into a positioning hole formed at a position corresponding to the self-aligning clamp, and a rod-shaped rough guide mounted in a vertical direction and is inserted into a guide hole,
wherein the self-aligning clamp and the rough guide are provided to an upper surface of each of the plurality of the fixing units, and the positioning hole and the guide hole are provided to the lower surface of the holding fixture, or the self-aligning clamp and the rough guide are provided to the lower surface of the holding fixture, and the positioning hole and the guide hole are provided to the upper surface of each of the plurality of the fixing units, and
the holding fixture is mounted on and removed from the plurality of fixing units.

2. The holding fixture fixing apparatus according to claim 1, wherein
the holding fixture includes:
two straight members opposedly facing each other and extending parallel to each other; and
two curved members each having a curved shape which corresponds the curved shape of the aircraft panel, the curved members being disposed on planes perpendicular to an axis direction of the straight member, and opposedly facing each other, wherein
both end portions of each of the straight members are coupled to an end portion of one of the curved members and an end portion of the other of the curved members.

3. The holding fixture fixing apparatus according to claim 1, further comprising:
a stage unit to which the positioning unit is fixed;
a laser tracker configured to emit a laser beam to a reflector installed on the stage unit and configured to receive the laser beam reflected on the reflector so as to detect a position of the reflector; and
a control unit configured to adjust a position of the stage unit based on the position of the reflector detected by the laser tracker.

4. The holding fixture fixing apparatus according to claim 1, wherein the plurality of bar-shaped cross beam members disposed perpendicular to a longitudinal direction of the holding fixture fixing apparatus is configured to be removable.

5. The holding fixture fixing apparatus according to claim 1, wherein a diameter of the guide hole is set to a size obtained by adding a tolerance, which does not allow the self-aligning clamp or the positioning hole to come into contact at a displaced position, to a diameter of the rough guide.

6. The holding fixture fixing apparatus according to claim 1, wherein, in a case the rough guide is provided to the upper surface of each of the plurality of the fixing units, the rough guide is inserted into the guide hole so that the holding fixture can be moved along the rough guide.

7. A holding fixture fixing apparatus comprising:
a plurality of fixing units configured to support and fix a holding fixture, which holds an aircraft panel having a curved shape in cross section, from a lower surface of the holding fixture, the fixing units being provided on an installation surface, wherein
the plurality of fixing units is provided corresponding to at least four corners of the lower surface of the holding fixture,
the fixing units are connected to each other by way of a plurality of bar-shaped cross beam members,
the fixing units comprise a positioning unit configured to define a position of the holding fixture in a horizontal plane or in a height direction,
the positioning unit comprises a self-aligning clamp which projects in a vertical direction and is fitted into a positioning hole formed at a position corresponding to the self-aligning clamp, and a rod-shaped rough guide mounted in a vertical direction and is inserted into a guide hole,
wherein the self-aligning clamp and the rough guide are provided to an upper surface of each of the plurality of the fixing units, and the positioning hole and the guide hole are provided to the lower surface of the holding fixture, or, the self-aligning clamp and the rough guide are provided to the lower surface of the holding fixture, and the positioning hole and the guide hole are provided to the upper surface of each of the plurality of the fixing units,
the holding fixture includes:
two straight members opposedly facing each other and extending parallel to each other; and
two curved members each having a curved shape which corresponds to the curved shape of the aircraft panel, the curved members being disposed on planes perpendicular to an axis direction of the straight member, and opposedly facing each other,
both end portions of the straight member are coupled to an end portion of one of the curved members and an end portion of the other of the curved members, and
the fixing unit and the holding fixture are fixed to each other at a position directly below a portion at which the straight member and the curved member are coupled to each other.

8. The holding fixture fixing apparatus according to claim 7, further comprising:
a stage unit to which the positioning unit is fixed;
a laser tracker configured to emit a laser beam to a reflector installed on the stage unit and configured to receive the laser beam reflected on the reflector so as to detect a position of the reflector; and
a control unit configured to adjust a position of the stage unit based on the position of the reflector detected by the laser tracker.

9. The holding fixture fixing apparatus according to claim 7, wherein the plurality of bar-shaped cross beam members disposed perpendicular to a longitudinal direction of the holding fixture fixing apparatus is configured to be removable.

10. The holding fixture fixing apparatus according to claim 7, wherein a diameter of the guide hole is set to a size obtained by adding a tolerance, which does not allow the self-aligning clamp or the positioning hole to come into contact at a displaced position, to a diameter of the rough guide.

11. The holding fixture fixing apparatus according to claim 7, wherein, in a case the rough guide is provided to the upper surface of each of the plurality of the fixing units, the rough guide is inserted into the guide hole so that the holding fixture can be moved along the rough guide.

* * * * *